US011233433B2

United States Patent
Iga et al.

(10) Patent No.: US 11,233,433 B2
(45) Date of Patent: Jan. 25, 2022

(54) ROTOR AND MOTOR

(71) Applicant: NIDEC CORPORATION, Kyoto (JP)

(72) Inventors: Tomoki Iga, Kyoto (JP); Hiroshi Nagano, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 84 days.

(21) Appl. No.: 16/760,020

(22) PCT Filed: Oct. 31, 2018

(86) PCT No.: PCT/JP2018/040470
§ 371 (c)(1),
(2) Date: Apr. 28, 2020

(87) PCT Pub. No.: WO2019/088156
PCT Pub. Date: May 9, 2019

(65) Prior Publication Data
US 2020/0350793 A1 Nov. 5, 2020

(30) Foreign Application Priority Data
Oct. 31, 2017 (JP) .............................. JP2017-211274

(51) Int. Cl.
*H02K 1/27* (2006.01)
*H02K 1/28* (2006.01)

(52) U.S. Cl.
CPC .............. *H02K 1/28* (2013.01); *H02K 1/278* (2013.01)

(58) Field of Classification Search
CPC ....... H02K 1/28; H02K 1/278; H02K 2213/03
See application file for complete search history.

(56) References Cited

U.S. PATENT DOCUMENTS

| 9,847,682 | B2 | 12/2017 | Takahashi |
| 2009/0140598 | A1 | 6/2009 | Schieweck et al. |
| 2012/0019097 | A1 | 1/2012 | Kwon et al. |

(Continued)

FOREIGN PATENT DOCUMENTS

| CN | 103516083 A | 1/2014 |
| JP | H2123936 A | 5/1990 |
| JP | 200125209 A | 1/2001 |

(Continued)

OTHER PUBLICATIONS

International Search Report in PCT/JP2018/040470, dated Jan. 29, 2019. 5pp.

*Primary Examiner* — Thomas Truong
(74) *Attorney, Agent, or Firm* — Hauptman Ham, LLP

(57) ABSTRACT

A virtual circle included in the through-hole as viewed from the axial direction is assumed in the through-hole. An inner peripheral surface of the through-hole includes a first side that is located on a radial inside with respect to the virtual circle and extends along the circumferential direction, a second side that is located on one side in the circumferential direction with respect to the virtual circle and extends along the radial direction, and a third side that is located on another side in the circumferential direction with respect to the virtual circle and extends along the radial direction. The second side and the third side contact with the virtual circle. The first side extends linearly or extends radially outward in a curved manner when viewed from the axial direction.

15 Claims, 17 Drawing Sheets

(56) References Cited

U.S. PATENT DOCUMENTS

| | | | |
|---|---|---|---|
| 2012/0049686 A1* | 3/2012 | Mizuike | H02K 1/28 310/156.53 |
| 2013/0020898 A1 | 1/2013 | Ryu et al. | |

FOREIGN PATENT DOCUMENTS

| | | | |
|---|---|---|---|
| JP | 2005168151 | A | 6/2005 |
| JP | 2009303446 | A | 12/2009 |
| JP | 2011259689 | A | 12/2011 |
| JP | 201597436 | A | 5/2015 |
| WO | 2014208582 | A1 | 12/2014 |
| WO | 2017006430 | A1 | 1/2017 |

\* cited by examiner

ROTOR AND MOTOR

CROSS-REFERENCE TO RELATED APPLICATIONS

This is the U.S. national stage of application No. PCT/JP2018/040470, filed on Oct. 31, 2018, and priority under 35 U.S.C. § 119(a) and 35 U.S.C. § 365(b) is claimed from Japanese Application No. 2017-211274, filed on Oct. 31, 2017.

FIELD OF THE INVENTION

The present invention relates to a rotor and a motor.

BACKGROUND

A rotor having a shaft and a rotor core, which are fixed to each other, is known in a motor. A structure fixed by key fitting, a structure fixed by press fitting, and the like are known as a fastening structure between the shaft and the rotor core. For example, a structure in which the shaft and the rotor core are key-fitted has been known.

When the fixing structure by the key fitting is adopted, a gap is circumferentially provided in a fitting unit between the shaft and the rotor core. For this reason, vibration during high-speed rotation may be generated. When the fixing structure in which the shaft is press-fitted into the rotor core is adopted, a crack may be generated in the rotor core.

When a plurality of rotor cores are fixed to one shaft, each rotor core is circumferentially positioned with respect to the shaft. In this case, it is necessary to provide a reference in order to position the rotor core in the circumferential direction.

SUMMARY

According to one exemplary aspect of the present invention, a rotor used for an inner rotor type motor, the rotor includes: a shaft centered on a center axis extending in a vertical direction; a rotor core fixed to the shaft; and a rotor magnet supported by the rotor core. The rotor core includes a central hole in which the shaft is press-fitted and a plurality of through-holes that pierce in an axial direction and are arranged in a circumferential direction. A plurality of fitting protrusions that are arranged along the circumferential direction, protrudes radially inward, and contact with the shaft at a front end surface are provided on an inner circumferential surface of the central hole. The through-hole overlaps the fitting protrusion in a radial direction. A virtual circle that is included in the through-hole and contacts with an inner peripheral surface of the through-hole at at least two points as viewed from the axial direction is assumed in the through-hole. The inner peripheral surface of the through-hole includes a first side that is located on a radial inside with respect to the virtual circle and extends along the circumferential direction, a second side that is located on one side in the circumferential direction with respect to the virtual circle and extends along the radial direction, and a third side that is located on another side in the circumferential direction with respect to the virtual circle and extends along the radial direction. The second side and the third side contact with the virtual circle. The first side extends linearly or extends radially outward in a curved manner when viewed from the axial direction.

The above and other elements, features, steps, characteristics and advantages of the present disclosure will become more apparent from the following detailed description of the preferred embodiments with reference to the attached drawings.

DETAILED DESCRIPTION

Hereinafter, a stator manufacturing device and a stator manufacturing method according to an embodiment of the present invention will be described with reference to the drawings. Sometimes scales, numbers, and like of each structure illustrated in the following drawings differ from those of an actual structure or portions for the sake of easy understanding of each configuration.

In each drawing, a Z-axis is illustrated as appropriate. A Z-axis direction in each drawing is a direction parallel to an axial direction of a center axis J in FIG. 1. In the following description, a positive side (+Z-side) of the Z-axis direction is referred to as an "upper side", and a negative side (−Z-side) of the Z-axis direction is referred to as a "lower side". The upper side and the lower side are a direction used merely for description, and do not limit an actual positional relationship and an actual direction. Unless otherwise noted, the direction (Z-axis direction) parallel to the center axis J is simply referred to as an "axial direction" or a "vertical direction", a radial direction centered on the center axis J is simply referred to as a "radial direction", and the circumferential direction centered on the center axis J, namely, a direction about the center axis J is simply referred to as a "circumferential direction". In the following description, the term "in planar view" means a state viewed from the axial direction.

Figure 1:
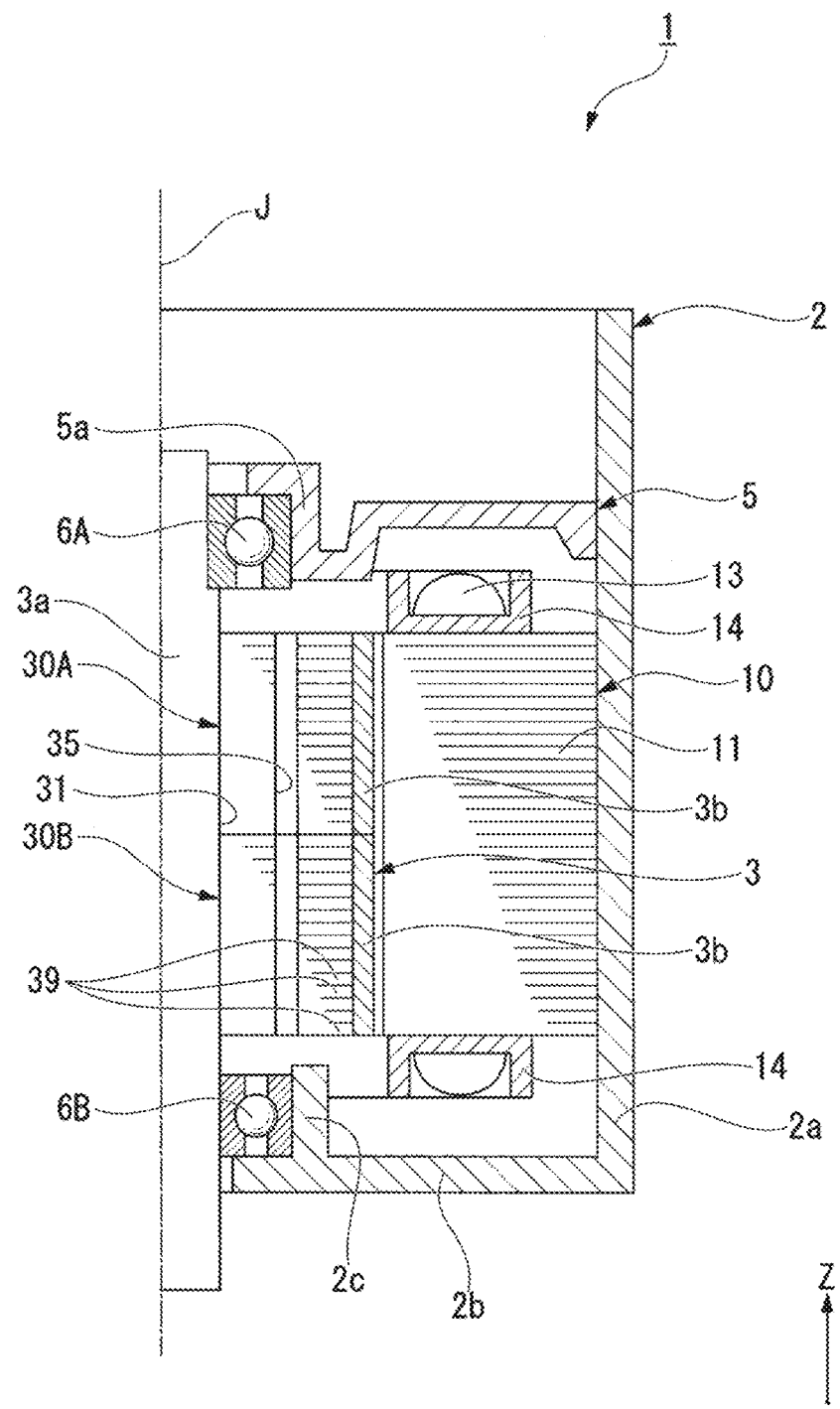
FIG. 1 is a sectional view schematically illustrating a motor according to a first embodiment.

FIG. 1 is a sectional view schematically illustrating a motor 1 along the center axis J according to a first embodiment. The motor 1 has a rotor 3, a stator 10, a housing 2, a bearing holder 5, an upper bearing 6A, and a lower bearing 6B. The motor 1 is what is called an inner rotor type motor in which the rotor 3 is disposed on a radial inside of the stator 10.

The housing 2 has a tubular shape that is open upward. The housing 2 accommodates the rotor 3, the stator 10, and the bearing holder 5. The housing 2 has a tubular unit 2a and a bottom 2b. The tubular unit 2a surrounds the stator 10 from a radial outside. The bottom 2b is located at a lower end of the tubular unit 2a. A lower bearing holder 2c holding the lower bearing 6B is provided at a center of the bottom 2b in planar view. The bearing holder 5 is located above the stator 10. The bearing holder 5 is held on an inner circumferential surface of the housing 2. The bearing holder 5 holds the upper bearing 6A in an upper bearing holder 5a. The stator 10 is annularly disposed around the center axis J. The stator 10 is located on the radial outside of the rotor 3. The stator 10 is radially opposed to the rotor 3 with the gap. The stator 10 is fixed to the inner circumferential surface of the housing 2. The stator 10 includes an annular stator core 11, a pair of insulators 14 mounted on the stator core 11 from the vertical direction, and a coil 13 mounted on the stator core 11 with the insulator 14 interposed therebetween.

The rotor 3 is used for the inner rotor type motor 1. The rotor 3 rotates about the center axis J extending in the vertical direction. The rotor 3 includes a shaft 3a, a plurality of rotor cores 30, and a plurality of rotor magnets 3b. The shaft 3a extends vertically with the center axis J extending vertically (axial direction) as the center. The shaft 3a has a circular section orthogonal to the center axis J. The shaft 3a is supported by the upper bearing 6A and the lower bearing 6B so as to be rotatable about the center axis J. The rotor core 30 is fixed to an outer circumferential surface of the shaft 3a. Two rotor cores (a first rotor core 30A and a second rotor core 30B) arranged in the axial direction are provided in the rotor 3 of the first embodiment. The first rotor core 30A and the second rotor core 30B have the same shape. When the first rotor core 30A and the second rotor core 30B are not distinguished from each other in the description, the first rotor core 30A and the second rotor core 30 are simply referred to as the rotor core 30. A rotor magnet 3b is fixed to each of outer peripheral surfaces of the first rotor core 30A and the second rotor core 30B. That is, the rotor magnet 3b is supported by the rotor core 30.

Figure 2:
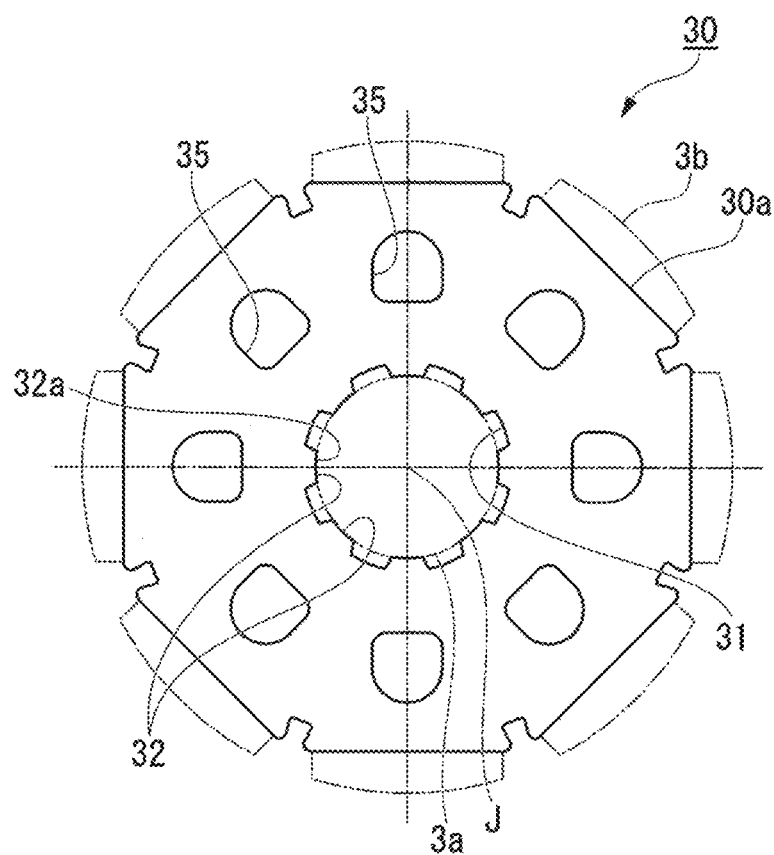
FIG. 2 is a plan view illustrating a rotor core of the first embodiment.

The first rotor core 30A and the second rotor core 30B are fixed to the shaft 3a while magnetic poles of the rotor magnets 3b are shifted in the circumferential direction. That is, the first rotor core 30A and the second rotor core 30B are disposed so as to be shifted from each other in a rotation direction at a predetermined skew angle. Consequently, a cogging torque of the motor 1 can be reduced. In the first embodiment, by way of example, the rotor 3 includes the two rotor cores 30. Alternatively, the rotor 3 may include at least three rotor cores arranged with a skew angle. The rotor core 30 is formed by laminating a plurality of electromagnetic steel sheets 39 along the axial direction. The plurality of electromagnetic steel sheets 39 have the same shape. A shape of the rotor core 30 viewed from the axial direction is matched with a shape of each electromagnetic steel sheet 39 viewed from the axial direction. FIG. 2 is a plan view illustrating the rotor core 30 of the first embodiment. The rotor core 30 extends along the axial direction with a uniform section. An outer shape of the rotor core 30 is substantially polygonal when viewed from the axial direction. In the first embodiment, the rotor core 30 has an octagonal shape when viewed from the axial direction. That is, the rotor core 30 of the first embodiment has an octagonal columnar shape.

The rotor core 30 includes eight holding surfaces 30a facing the radial outside. The eight holding surfaces 30a constitute the outer peripheral surface of the rotor core 30. The holding surfaces 30a are arranged in the circumferential direction. The holding surface 30a is a surface orthogonal to the radial direction. The rotor magnet 3b is fixed to the holding surface 30a with an adhesive or the like interposed therebetween. The rotor magnet 3b may be fixed by a tubular rotor cover. Eight rotor magnets 3b are provided in the rotor 3 of the first embodiment. The eight rotor magnets 3b are arranged while the magnetic poles are alternately oriented along the circumferential direction. The number of the holding surfaces 30a of the rotor core 30 and the number of the rotor magnets 3b provided in the rotor 3 are only by way of example, and are not limited to the first embodiment.

The rotor core 30 includes a central hole 31 located at the center in planar view. The central hole 31 pierces in the axial direction. The central hole 31 has a substantially circular shape centered on the center axis J. The shaft 3a is press-fitted into the central hole 31. A plurality of fitting protrusions 32 are provided on the inner circumferential surface of the central hole 31. In the first embodiment, eight fitting protrusions 32 are provided on the inner circumferential surface of the central hole 31. The plurality of fitting protrusions 32 are arranged at equal intervals along the circumferential direction. The fitting protrusion 32 protrudes toward the radial inside. The fitting protrusion 32 includes a front end surface 32a facing the radial inside. The front end surface 32a has an arc shape centered on the center axis J, and extends uniformly along the axial direction. The fitting protrusion 32 contacts with the shaft 3a at the front end surface 32a. In the description, the term "the inner circumferential surface of the central hole" means a surface constituting the central hole in the rotor core.

A plurality of through-holes 35 are provided in the rotor core 30. In the first embodiment, eight through-holes 35 are made in the rotor core 30. The through-hole 35 pierces in the axial direction. The plurality of through-holes 35 are arranged at equal intervals along the circumferential direction. In the rotor 3 of the first embodiment, the number of the rotor magnets 3b, the number of the through-holes 35, and the number of the fitting protrusions 32 are matched with each other. The rotor magnet 3b, the through-hole 35, and the fitting protrusion 32 are arranged at equal intervals along the circumferential direction. One rotor magnet 3b, one through-hole 35, and one fitting protrusion 32 are disposed so as to overlap each other in the radial direction.

Figure 3:
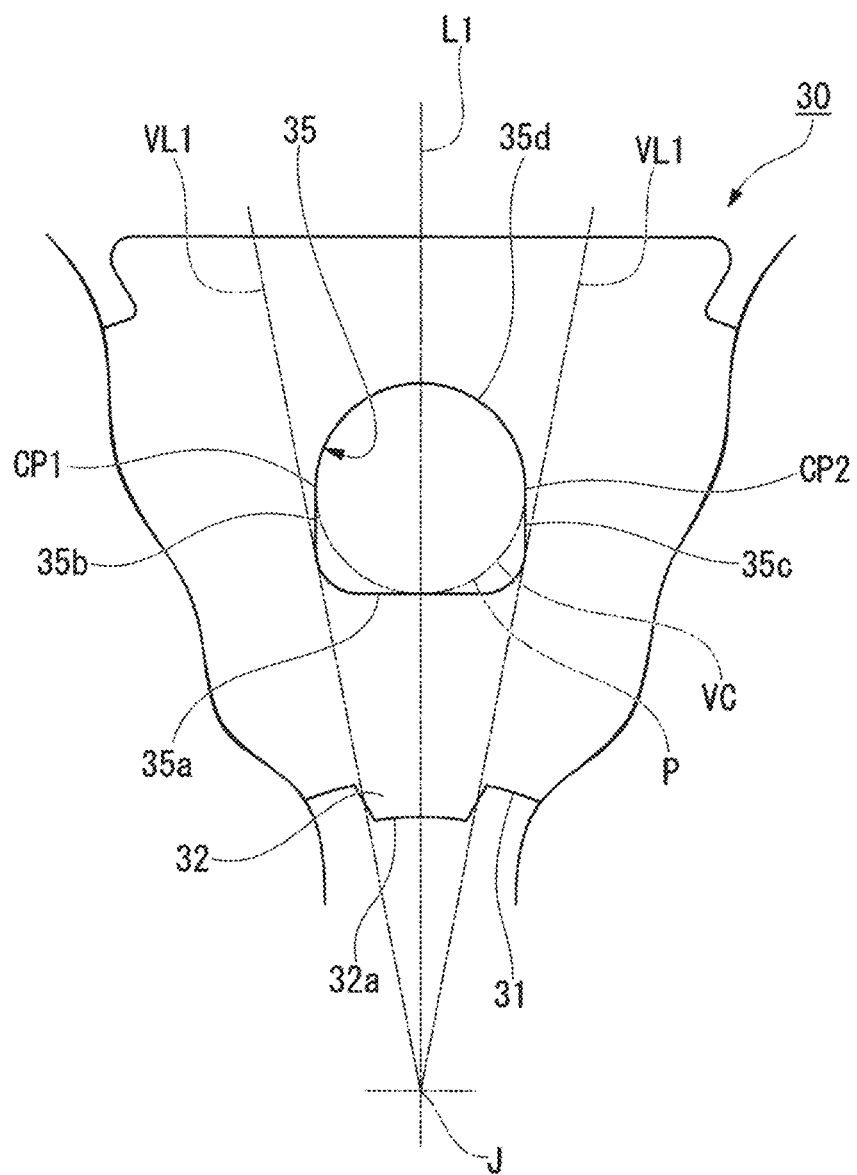
FIG. 3 is an enlarged plan view illustrating a through-hole of the rotor core of the first embodiment.

FIG. 3 is an enlarged plan view illustrating a part of the through-hole 35 of the rotor core 30. The through-hole 35 overlaps the fitting protrusion 32 in the radial direction. When the through-hole 35 is made on the radial outside of the fitting protrusion 32, the rotor core 30 is easily elastically deformed in press-fitting the shaft 3a in the central hole 31. This facilitates the displacement onto the radial outside of the fitting protrusion 32. As a result, stress generated in press-fitting the shaft 3a into the rotor core 30 is reduced to facilitate an assembly process. Additionally, the elastic deformation of the rotor core 30 is promoted between the fitting protrusion 32 and the through-hole 35, which stabilizes a pressure that is generated when the fitting protrusion 32 comes into contact with the front end surface 32a. Consequently, the shaft 3a can stably be held in the central hole 31. When the through-hole 35 is made on the radial outside of the fitting protrusion 32, the deformation of the rotor core 30 is absorbed by the through-hole 35 when the shaft 3a is press-fitted into the central hole 31. For this reason, the deformation of the rotor core 30 on the radial outside of the through-hole 35 is prevented. As a result, the deformation of the holding surface 30a of the rotor core 30 is prevented, and reliability of holding of the rotor magnet 3b can be enhanced in the holding surface 30a. Additionally, the deformation of the rotor core 30 is prevented near the rotor magnet 3b, and disturbance of a magnetic path can be prevented near the rotor core 30.

As illustrated in FIG. 3, a pair of virtual lines (first virtual lines) VL1 connecting both ends in the circumferential direction of the through-hole 35 and the center axis J as viewed from the axial direction is assumed in the rotor core 30. The front end surface 32a of the fitting protrusion 32 is located between the pair of virtual lines VL1 in the circumferential direction. For this reason, the deformation of the rotor core 30 behind the fitting protrusion 32 can more certainly be absorbed by the through-hole 35. As a result, the deformation of the rotor core 30 can more effectively be prevented on the radial outside of the through-hole 35. Additionally, a whole region of the front end surface 32a of the fitting protrusion 32 is located on the radial inside of the through-hole 35. For this reason, the contact pressure can be uniformized over the whole region of the front end surface 32a, and the shaft 3a can stably be held in the central hole 31.

As illustrated in FIG. 3, one through-hole 35 of the first embodiment is formed of one hole. A virtual circle VC included in the through-hole 35 as viewed from the axial direction is assumed in the through-hole 35. The virtual circle VC corresponds to a sectional shape of a positioning pin P inserted into the through-hole 35. An inner peripheral surface of the through-hole 35 includes a first side 35a, a second side 35b, a third side 35c, and a fourth side 35d. The first side 35a is located on the radial inside of the virtual circle VC. The first side 35a extends along the circumferential direction. In the first embodiment, the first side 35a extends linearly in the direction orthogonal to the radial direction when viewed from the axial direction.

In the description, the term "extending along one direction (for example, the radial direction or the circumferential direction)" is not limited to the case of extending along one direction in a strict sense, but may extend obliquely with respect to one direction within a range of ±45°, or extend in a curved manner.

The second side 35b is located on one side in the circumferential direction with respect to the virtual circle VC. The third side 35c is located on the other side in the circumferential direction with respect to the virtual circle VC. That is, the second side 35b and the third side 35c are opposed to each other in the circumferential direction. The second side 35b extends linearly from one end of the first side 35a toward the radial outside. The third side 35c extends linearly from the other end of the first side 35a toward the radial outside. In the first embodiment, a corner R is provided at a boundary between the first side 35a and the second side 35b and between the first side 35a and the third side 35c. The second side 35b and the third side 35c extend in the radial direction. As illustrated in FIG. 3, a center line (straight line) L1 connecting the center axis and the center of the virtual circle is assumed in the through-hole 35 when viewed from the axial direction. The second side 35b and the third side 35c extend in parallel with the center line L1. The fourth side 35d is located on the radial outside with respect to the virtual circle VC. The fourth side 35d extends along the circumferential direction. The fourth side 35d connects ends on the radial outsides of the second side 35b and the third side 35c. In the first embodiment, the fourth side 35d extends in an arc shape along the virtual circle VC. In the first embodiment, the second side 35b and the third side 35c contact with the virtual circle VC. For this reason, the rotor core 30 can be positioned in the circumferential direction by inserting the columnar positioning pin P having the sectional shape of the virtual circle VC into the through-hole 35.

An example of a method for positioning the rotor core 30 will specifically be described. The two rotor cores 30 are provided in the rotor 3 of the first embodiment. The two rotor cores 30 are the first rotor core 30A and the second rotor core 30B in FIG. 1. The two rotor cores 30 are disposed while shifted from each other in the circumferential direction at the predetermined skew angle. The rotor cores 30 are positioned when the skew angle between the rotor cores 30 is given. First, the columnar positioning pins P are inserted into at least three of the plurality of through-holes 35 in the two rotor cores 30. The three positioning pins P have the sectional shape of the virtual circle VC. The three positioning pins P are arranged in parallel to each other along the axial direction. For example, the three positioning pins P are arranged such that the centers of the three positioning pins P form vertices of an equilateral triangle when viewed from the axial direction. Preferably the three positioning pins P are arranged such that the through-holes 35 of the three positioning pins P are not adjacent to each other when viewed from the axial direction.

The three positioning pins P are inserted into three through-holes 35 symmetrically arranged with respect to the center axis J in the plurality of through-holes 35 of the rotor core 30. Each positioning pin P inserted into the through-hole 35 contacts with the second side 35b and the third side 35c in the circumferential direction.

Consequently, the rotor core 30 is positioned in the circumferential direction with respect to a jig including the positioning pins P. Using the three positioning pins P, the rotor core 30 can also be positioned in the radial direction with respect to the jig including the positioning pins P when the radial outside region of one positioning pin P is in contact with the inner peripheral surface of the through-hole 35. The two rotor cores 30 positioned in the circumferential direction and the radial direction using the jig including the three positioning pins P are positioned in the circumferential direction based on the positioning pins P, and the shaft 3a is press-fitted. Consequently, the rotor 3 in which the skew angles are given to the two rotor cores 30 can be assembled.

The through-hole 35 of the rotor core 30 may be used to position the plurality of electromagnetic steel sheets 39 constituting the rotor core 30 when the electromagnetic steel sheets 39 are laminated. As an example, a jig in which the three positioning pins P are erected in parallel with each other is prepared, and the positioning pins P are inserted into the three through-holes 35 of the plurality of electromagnetic steel sheets 39 and sequentially laminated, thereby positioning the plurality of electromagnetic steel sheets 39.

As illustrated in FIG. 3, the second side 35b and the virtual circle VC contact with each other at a first contact point CP1. Similarly, the second side 35b and the virtual circle VC contact with each other at a second contact point CP2. The first contact point CP1 and the second contact point CP2 are arranged symmetrically with respect to the center line L1 connecting the center axis J and the center of the virtual circle VC when viewed from the axial direction. For this reason, the contact between the positioning pin P and the inner peripheral surface of the through-hole 35 is stabilized in the circumferential direction at the first contact point CP1 and the second contact point CP2. Thus, positioning accuracy of the rotor core 30 by the positioning pins P can be enhanced.

In the first embodiment, the first side 35*a* extends linearly along the circumferential direction. When the first side 35*a* is curved radially inward, the stress during the deformation of the rotor core 30 is increased at a position closest to the front end surface 32*a* of the fitting protrusion 32 of the first side 35*a*. In the first embodiment, the first side 35*a* extends linearly. For this reason, the rotor core 30 can be prevented from being locally thinned between the first side 35*a* and the central hole 31. That is, the first side 35*a* extends linearly along the circumferential direction, which allows the generation of a crack to be prevented in the first side 35*a* of the rotor core 30. The positioning pin P can be prevented from being hardly inserted into the through-hole 35 due to the marked deformation of the first side 35*a*. Such the effects can be obtained not only when the first side 35*a* extends linearly, but also when the first side 35*a* extends radially outward in a curved manner. That is, when viewed from the axial direction, the first side 35*a* may extend linearly, or extend radially outward in the curved manner.

In the first embodiment, the first side 35*a* contacts with the virtual circle VC. When the positioning pin P is inserted into the through-hole 35, the positioning pin P contacts with the first side 35*a*. Consequently, the first side 35*a* can be used for the rotor core 30 using the positioning pin P. The first side 35*a* constitutes a surface facing the radial outside in the inner peripheral surface of the through-hole 35. The rotor core 30 can be positioned in the radial direction by bringing the positioning pin P into contact with the first side 35*a*. As a result, the jig used for the positioning can be simplified. More specifically, even with a jig including two positioning pins P, the rotor core 30 can be positioned in the circumferential direction and the radial direction.

In the first embodiment, the fourth side 35*d* extends in an arc shape along the virtual circle VC, and contacts with the virtual circle VC. The fourth side 35*d* constitutes a surface facing the radial inside in the inner peripheral surface of the through-hole 35. For this reason, in the fourth side 35*d*, similarly to the first side 35*a*, the positioning pin P is caused to come into contact with the first side 35*a*, which allows the rotor core 30 to be positioned in the radial direction using one positioning pin P. As a result, the jig used for the positioning can be simplified. In the first embodiment, the rotor core 30 is formed by laminating the plurality of electromagnetic steel sheets 39 in the axial direction. Each electromagnetic steel sheet 39 is formed by pressing a plate material. The through-hole 35 is made by a punching process of the electromagnetic steel sheet 39. When the rotor core 30 is manufactured through the above processes, the through-hole 35 may be made by performing a plurality of punching processes. In a typical punching process, dimensional accuracy of an arc portion is easily enhanced. The arc-shaped fourth side 35*d* is provided on the inner peripheral surface of the through-hole 35 of the first embodiment. In the arc portion, the positioning accuracy of the positioning pin P can be enhanced by bringing the columnar positioning pin P having the sectional shape of the virtual circle into contact with the arc portion (fourth side 35*d*) of the through-hole. In the first embodiment, damage to the rotor core 30 can be suppressed when the shaft 3*a* is press-fitted into the rotor core 30. In the first embodiment, the rotor 3 in which the rotor core 30 is easily positioned during the assembly can be provided.

Rotor cores 130A to 130E according to first to fifth modifications of the first embodiment will be described below. Components identical to those of the first embodiment are denoted by the same reference numeral, and the description will be omitted.

Figure 4:
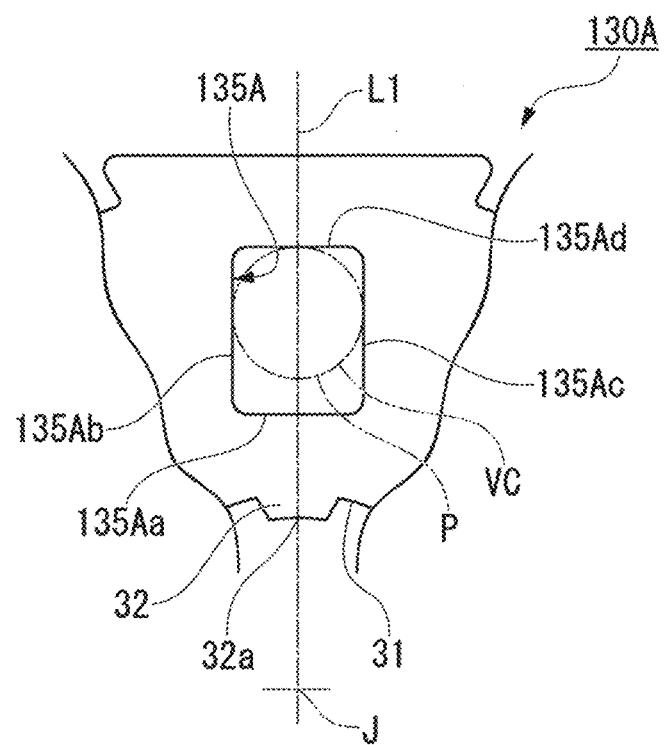
FIG. 4 is an enlarged plan view illustrating a through-hole of a rotor core according to a first modification.

FIG. 4 is an enlarged plan view illustrating a through-hole 135A of a part of a rotor core 130A according to a first modification. The central hole 31 in which the shaft 3*a* is press-fitted and a plurality of through-holes 135A arranged in the circumferential direction are made in the rotor core 130A. Similarly to the first embodiment, the plurality of fitting protrusions 32 are provided on the inner circumferential surface of the central hole 31. The through-hole 135A overlaps the fitting protrusion 32 in the radial direction. The virtual circle VC included in the through-hole 135A as viewed from the axial direction is assumed in the through-hole 135A. The inner circumferential surface of the through-hole 135A includes a first side 135Aa, a second side 135Ab, a third side 135Ac, and a fourth side 135Ad. The first side 135Aa is located on the radial inside of the virtual circle VC, and extends along the circumferential direction. The second side 135Ab is located on one side in the circumferential direction of the virtual circle VC, and extends along the radial direction. The third side 135Ac is located on the other side in the circumferential direction of the virtual circle VC, and extends along the radial direction. The fourth side 135Ad is located on the radial outside the virtual circle VC, and extends along the circumferential direction.

The through-hole 135A of the first modification is different from the through-hole 35 of the first embodiment in that the first side 135Aa is radially separated from the virtual circle VC and does not contact with the virtual circle VC. In the first modification, the first side 135Aa is separated from the virtual circle VC, so that a surface pressure can be adjusted at the front end surface 32*a* of the fitting protrusion 32 by adjusting the distance between the through-hole 135A and the central hole 31. The through-hole 135A of the first modification is different from the through-hole 35 of the first embodiment in that the fourth side 135Ad extends linearly along the radial direction. In the first modification, the fourth side 135Ad contacts the virtual circle VC at one point.

Figure 5:
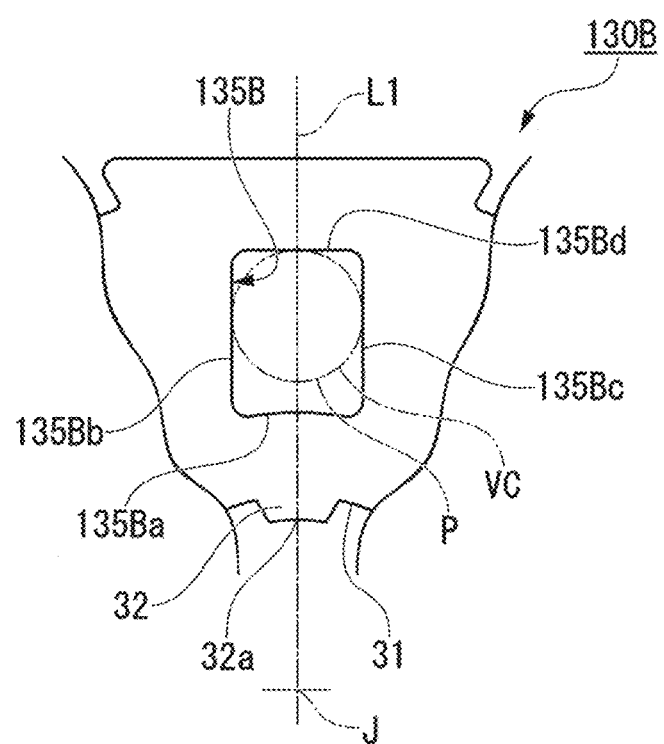
FIG. 5 is an enlarged plan view illustrating a through-hole of a rotor core according to a second modification.

FIG. 5 is an enlarged plan view illustrating a through-hole 135B of a part of a rotor core 130B according to a second modification. The central hole 31 in which the shaft 3*a* is press-fitted and a plurality of through-holes 135B arranged along the circumferential direction are made in the rotor core 130B. Similarly to the first embodiment, the plurality of fitting protrusions 32 are provided on the inner circumferential surface of the central hole 31. The through-hole 135B overlaps the fitting protrusion 32 in the radial direction. The virtual circle VC included in the through-hole 135B as viewed from the axial direction is assumed in the through-hole 135B. The inner circumferential surface of the through-hole 135B includes a first side 135Ba, a second side 135Bb, a third side 135Bc, and a fourth side 135Bd.

The first side 135Ba is located on the radial inside of the virtual circle VC, and extends along the circumferential direction. The second side 135Bb is located on one side in the circumferential direction of the virtual circle VC, and extends along the radial direction. The third side 135Bc is located on the other side in the circumferential direction of the virtual circle VC, and extends along the radial direction. The fourth side 135Bd is located radially outward of the virtual circle VC and extends along the circumferential direction. The through-hole 135B of the second modification is different from the through-hole 135A of the first modification in that the first side 135Ba is curved radially outward. That is, the first side 135Ba of the second modification extends radially outward in the curved manner when viewed from the axial direction. When the first side 135Ba is curved radially outward as viewed from the axial direction, a radial thickness of the rotor core 130B between the through-hole 135B and the fitting protrusion 32 is uniformized as compared with the case where the first side 135Ba is the straight line. Consequently, rigidity on the radial outside of the fitting protrusion 32 of the rotor core 130B is uniformized. As a result, the surface pressure of the front end surface 32a of the fitting protrusion 32 is uniformized when the shaft 3a is press-fitted in the central hole 31, and the holding of the shaft 3a by the central hole 31 can be stabilized.

When viewed from the axial direction, preferably a curvature radius at any point on the first side 135Ba is greater than or equal to the distance between the point and the center axis J. When viewed from the axial direction, when the curvature radius at an any point on the first side is smaller than the distance between the point and the center axis J, at both ends of the first side, an angle of the boundary between the second side and the third side decreases to generate stress concentration. In the second modification, the stress concentration can be prevented at both the ends of the first side 135Ba, and the generation of the cracks can be prevented in the rotor core 130B at both the ends of the first side 135Ba.

As illustrated in the first embodiment and the first modification, the case where the first sides 35a, 135Aa extend linearly in the direction orthogonal to the radial direction can be considered as the case where the curvature radii of the first sides 35a, 135Aa diffuse infinitely. Even in this case, the effect that prevents the stress concentration can be obtained. In the second modification, the first side 135Ba is separated from the virtual circle VC in the radial direction, so that the surface pressure can be adjusted at the front end surface 32a of the fitting protrusion 32 by adjusting the distance between the through-hole 135B and the central hole 31.

Figure 6:
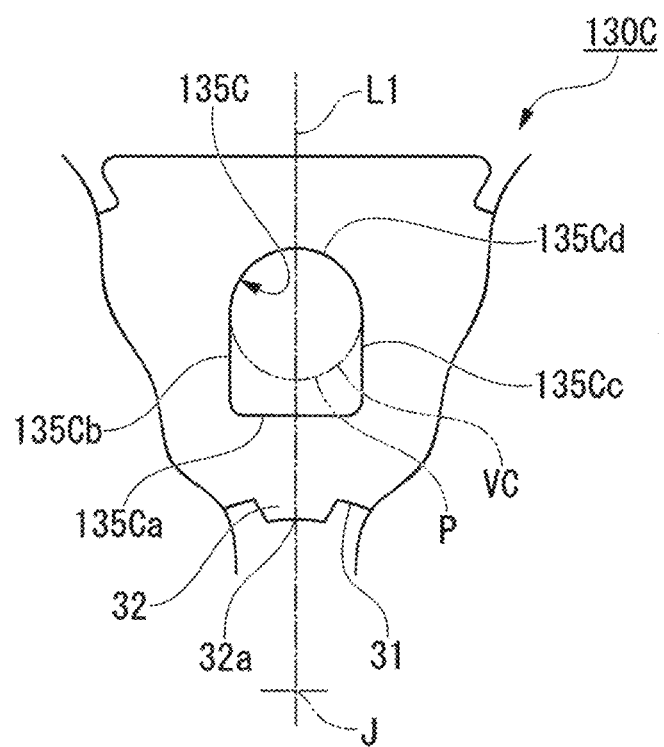
FIG. 6 is an enlarged plan view illustrating a through-hole of a rotor core according to a third modification.

FIG. 6 is an enlarged plan view illustrating a through-hole 135C of a part of the rotor core 130C according to a third modification. The central hole 31 in which the shaft 3a is press-fitted and a plurality of through-holes 135C arranged along the circumferential direction are made in the rotor core 130C. Similarly to the first embodiment, the plurality of fitting protrusions 32 are provided on the inner circumferential surface of the central hole 31. The through-hole 135C overlaps the fitting protrusion 32 in the radial direction. The virtual circle VC included in the through-hole 135C as viewed from the axial direction is assumed in the through-hole 135C. The inner circumferential surface of the through-hole 135C includes a first side 135Ca, a second side 135Cb, a third side 135Cc, and a fourth side 135Cd. The first side 135Ca is located on the radial inside of the virtual circle VC, and extends along the circumferential direction. The second side 135Cb is located on one side in the circumferential direction of the virtual circle VC, and extends along the radial direction. The third side 135Cc is located on the other side in the circumferential direction of the virtual circle VC, and extends along the radial direction. The fourth side 135Cd is located on the radial outside of the virtual circle VC, and extends along the circumferential direction. The through-hole 135C of the third modification is different from the through-hole 35 of the first embodiment in that the first side 135Ca is radially separated from the virtual circle VC and does not contact with the virtual circle VC. In the third modification, the first side 135Ca is separated from the virtual circle VC, so that the surface pressure can be adjusted at the front end surface 32a of the fitting protrusion 32 by adjusting the distance between the through-hole 135C and the central hole 31.

Figure 7:
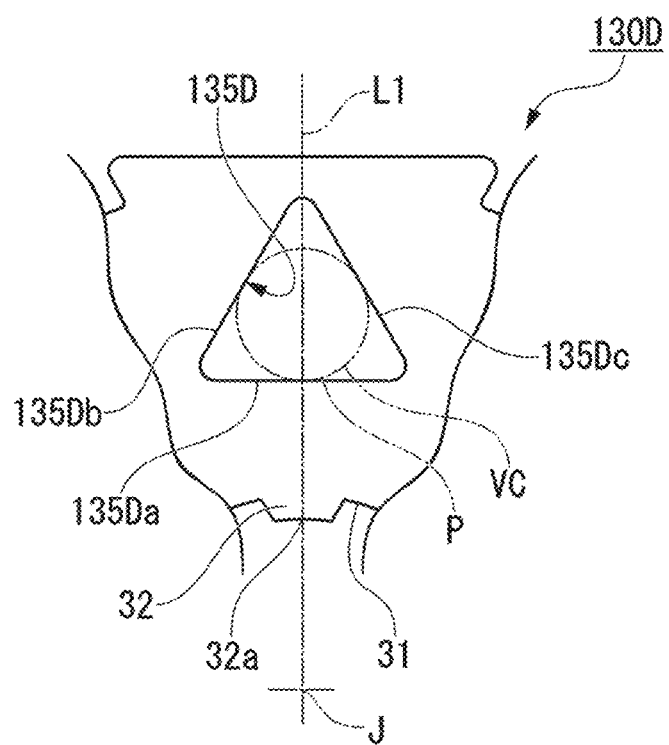
FIG. 7 is an enlarged plan view illustrating a through-hole of a rotor core according to a fourth modification.

FIG. 7 is an enlarged plan view illustrating a through-hole 135D of a part of a rotor core 130D according to a fourth modification. The central hole 31 in which the shaft 3a is press-fitted and a plurality of through-holes 135D arranged along the circumferential direction are made in the rotor core 130D. Similarly to the first embodiment, the plurality of fitting protrusions 32 are provided on the inner circumferential surface of the central hole 31. The through-hole 135D overlaps the fitting protrusion 32 in the radial direction. The virtual circle VC included in the through-hole 135D as viewed from the axial direction is assumed in the through-hole 135D. The inner circumferential surface of the through-hole 135D includes a first side 135Da, a second side 135Db, and a third side 135Dc. The first side 135Da is located on the radial inside of the virtual circle VC, and extends along the circumferential direction. The second side 135Db is located on one side in the circumferential direction of the virtual circle VC, and extends along the radial direction. The third side 135Dc is located on the other side in the circumferential direction of the virtual circle VC, and extends along the radial direction.

The through-hole 135D of the fourth modification is mainly different from the through-hole 35 of the first embodiment in that the through-hole 135D does not includes the fourth side. The first side 135Da of the fourth modification extends linearly in the direction orthogonal to the radial direction. Both the ends of the first side 135Da are connected to the second side 135Db and the third side 135Dc with the corner R interposed therebetween. The second side 135Db and the third side 135Dc extend radially outward from both the ends of the first side 135Da. The second side 135Db and the third side 135Dc extend linearly while inclining in the direction close to the side of the center line L1 connecting the center axis J and the center of the virtual circle VC toward the radial outside. The end on the radial outside of the second side 135Db and the end on the radial outside of the third side 135Dc are connected to each other. When viewed from the axial direction, the first side 135Da, the second side 135Db, and the third side 135Dc constitute a triangle. The first side 135Da, the second side 135Db, and the third side 135Dc contact with the virtual circle VC. The virtual circle VC is an inscribed circle of the through-hole 135D having the triangular shape.

Figure 8:
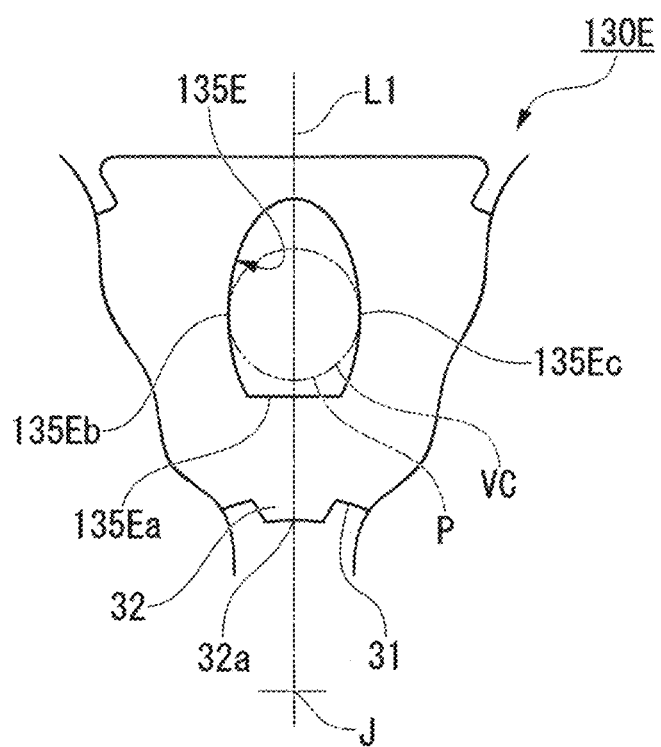
FIG. 8 is an enlarged plan view illustrating a through-hole of a rotor core according to a fifth modification.

FIG. 8 is an enlarged plan view illustrating a through-hole 135E of a part of a rotor core 130E according to a fifth modification. The central hole 31 in which the shaft 3a is press-fitted and a plurality of through-holes 135E arranged along the circumferential direction are made in the rotor core 130E. Similarly to the first embodiment, the plurality of fitting protrusions 32 are provided on the inner circumferential surface of the central hole 31. The through-hole 135E overlaps the fitting protrusion 32 in the radial direction. The virtual circle VC included in the through-hole 135E as viewed from the axial direction is assumed in the through-hole 135E. The inner circumferential surface of the through-hole 135E includes a first side 135Ea, a second side 135Eb, and a third side 135Ec.

The first side 135Ea is located on the radial inside of the virtual circle VC, and extends along the circumferential direction. The second side 135Eb is located on one side in the circumferential direction of the virtual circle VC, and extends along the radial direction. The third side 135Ec is located on the other side in the circumferential direction of the virtual circle VC, and extends along the radial direction. The through-hole 135E of the fifth modification is mainly different from the through-hole 35 of the first embodiment in that the through-hole 135E contacts with the virtual circle VC only at the second side 135Eb and the third side 135Ec. The first side 135Ea of the fifth modification extends linearly in the direction orthogonal to the radial direction. Both the ends of the first side 135Ea are connected to the second side 135Eb and the third side 135Ec. The second side 135Eb and the third side 135Ec of the fifth modification constitute one elliptical shape when viewed from the axial direction. In the through-hole 135E of the fifth modification, the second side 135Eb and the third side 135Ec have the elliptical shape in which a major axis is a center line L1 connecting the center axis J and the center of the virtual circle VC. The second side 135Eb and the third side 135Ec contact with the virtual circle VC. On the other hand, the first side 135Ea does not contact with the virtual circle VC. The inner circumferential surface of the through-hole 135E contacts with the virtual circle VC at two points.

Figure 9:
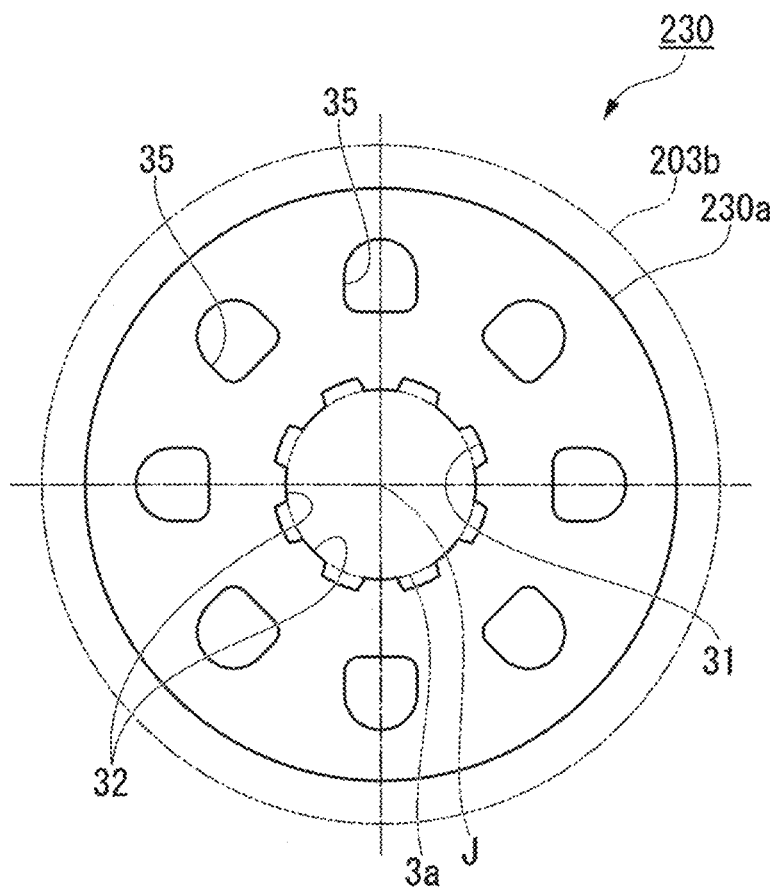
FIG. 9 is a plan view illustrating a rotor core according to a second embodiment.

FIG. 9 is a plan view of a rotor core 230 according to a second embodiment. In FIG. 9, a rotor magnet 203b fixed to an outer circumferential surface 230a of the rotor core 230 is illustrated by an alternate long and two short dashes line. Components identical to those of the first embodiment are denoted by the same reference numeral, and the description will be omitted.

The rotor core 230 extends in a uniform section along the axial direction. The rotor core 230 has a circular shape centered on the center axis J when viewed from the axial direction. That is, in the second embodiment, the rotor core 230 has a columnar shape. The rotor core 230 has the outer circumferential surface 230a facing the radial outside. The rotor magnet 203b is fixed to the outer circumferential surface 230a with an adhesive or the like interposed therebetween. The rotor magnet 203b may be fixed by a tubular rotor cover. The rotor magnet 203b of the second embodiment has an annular shape. The rotor magnet 203b is magnetized such that pluralities of N poles and S poles are alternately arranged along the circumferential direction. That is, the rotor magnet 203b has the annular shape in which the magnetic poles are arranged along the circumferential direction. The N poles and the S poles of the rotor magnet 203b may be spirally magnetized. Consequently, the cogging torque of the motor can be reduced.

Figure 10:
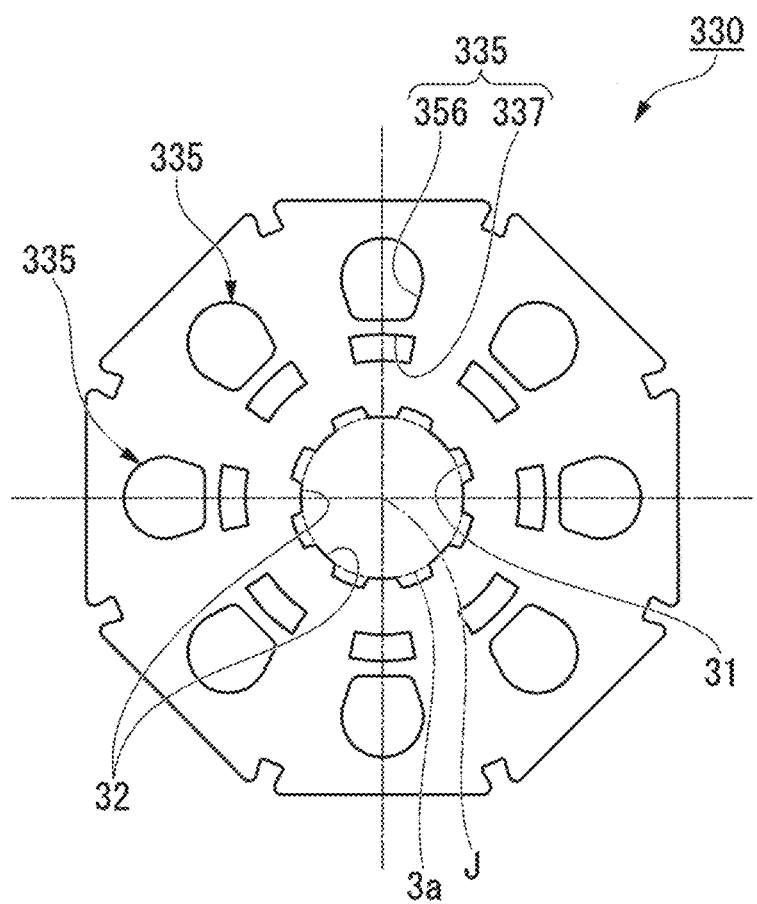
FIG. 10 is a plan view illustrating a rotor core according to a third embodiment.

FIG. 10 is a plan view of a rotor core 330 according to a third embodiment. Components identical to those of the first embodiment are denoted by the same reference numeral, and the description will be omitted.

The central hole 31 located at the center in planar view is made in the rotor core 330. The central hole 31 pierces in the axial direction. A plurality of fitting protrusions 32 are provided on the inner circumferential surface of the central hole 31. The shaft 3a is press-fitted into the central hole 31. A plurality of through-holes 335 are made in the rotor core 330. The through-hole 335 includes a first hole 336 and a second hole 337 located on the radial outside of the first hole 336. In the third embodiment, eight through-holes 335 are made in the rotor core 330. The through-hole 335 overlaps the fitting protrusion 32 in the radial direction. The through-hole 335 pierces in the axial direction. The plurality of through-holes 335 are arranged at equal intervals along the circumferential direction. The through-holes 335 as many as the fitting protrusions 32 are made in rotor core 330. In the third embodiment, the through-hole 335 includes the first hole 336 and the second hole 337. The number of the through-holes 335 is the number of sets each of which includes one first hole 336 and one second hole 337. Eight first holes 336 and eight second holes 337 are made in the rotor core 330 of the third embodiment.

Figure 11:
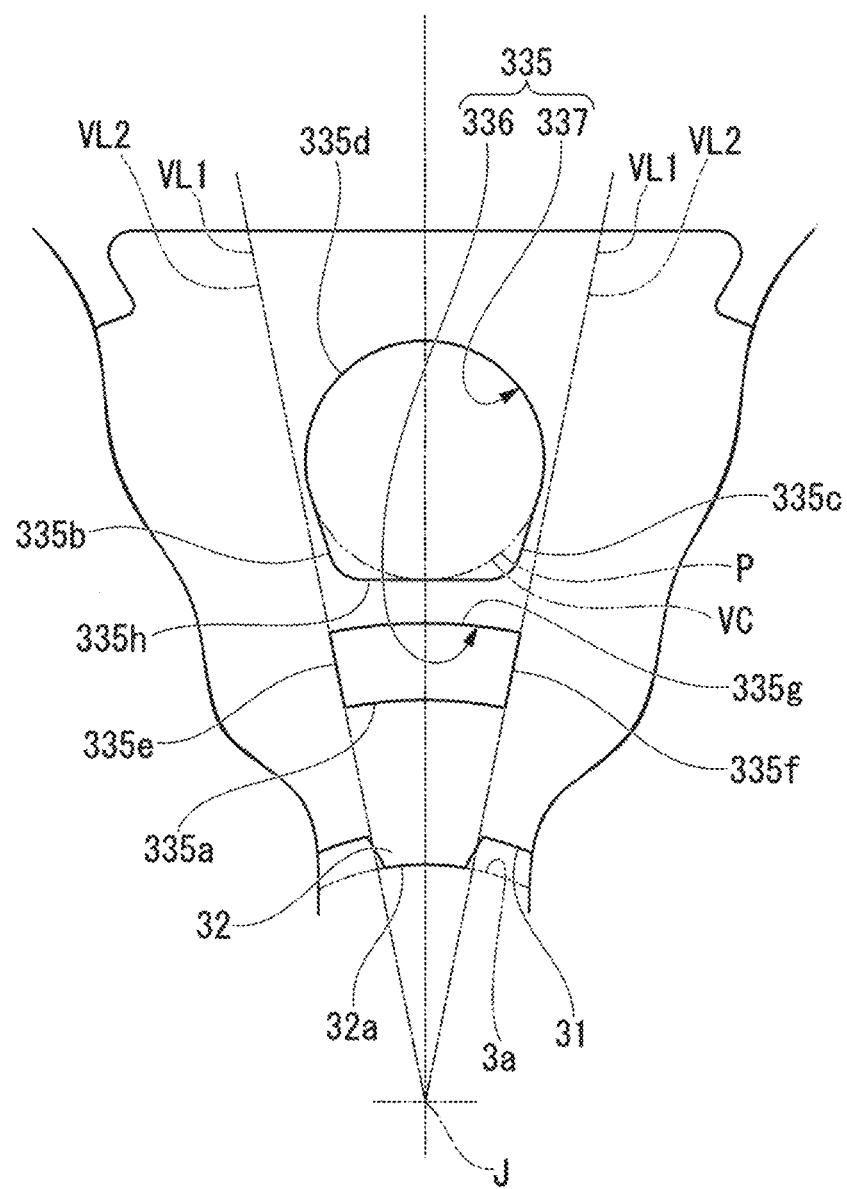
FIG. 11 is an enlarged plan view illustrating a through-hole of the rotor core of the third embodiment.

FIG. 11 is an enlarged plan view illustrating the through-hole 335 of a part of the rotor core 330. As described above, one through-hole 335 of the third embodiment includes two holes (the first hole 336 and the second hole 337). The virtual circle VC included in the second hole 337 as viewed from the axial direction is assumed in the second hole 337. The inner peripheral surface of the first hole 336 includes a first side 335a, a fifth side 335e, a sixth side 335f, and a seventh side 335g. That is, the inner peripheral surface of the through-hole 335 includes the first side 335a, the fifth side 335e, the sixth side 335f, and the seventh side 335g. The first hole 336 has a rectangular shape. Although not illustrated in FIG. 11, the corner R is provided at a boundary between the sides of the first hole 336. The first hole 336 overlaps the fitting protrusion 32 in the radial direction. The first hole 336 is located between the fitting protrusion 32 and the second hole 337 in the radial direction. The first hole 336 absorbs the deformation of the rotor core 330 when the shaft 3a is press-fitted in the central hole 31. Consequently, the pressure generated during the contact with the front end surface 32a of the fitting protrusion 32 is stabilized. The deformation of the rotor core 330 is prevented in the radial outside region of the first hole 336.

The first side 335a and the seventh side 335g extend in the circumferential direction. The first side 335a is located on the radial inside of the seventh side 335g. Because the first hole 336 is located on the radial inside of the second hole 337 including the virtual circle VC, the first side 335a and the seventh side 335g are located on the radial inside of the virtual circle VC. The first side 335a and the seventh side 335g extend radially outward in the curved manner when viewed from the axial direction. When viewed from the axial direction, the curvature radius at any point on each of the first side 335a and the seventh side 335g is greater than or equal to the distance between the point and the center axis J. Consequently, the stress concentration can be prevented, and the generation of the cracks in the rotor core 330 can be prevented at both the ends of each of the first side 335a and the seventh side 335g. The fifth side 335e and the sixth side 335f extend in the radial direction. The fifth side 335e connects the end on one side in the circumferential direction of the first side 335a and the end on one side in the circumferential direction of the seventh side 335g. Similarly, the sixth side 335f connects the end on the other circumferential side of the first side 335a and the end on the other circumferential side of the seventh side 335g. The inner peripheral surface of the second hole 337 includes a second side 335b, a third side 335c, a fourth side 335d, and an eighth side 335h. That is, the inner peripheral surface of the through-hole 335 includes the second side 335b, the third side 335c, the fourth side 335d, and the eighth side 335h. When the rotor core 330 is positioned, the positioning pin P having the sectional shape of the virtual circle VC is inserted into the second hole 337.

The eighth side 335h is located on the radial inside of the virtual circle VC. The eighth side 335h extends along the circumferential direction. In the third embodiment, the eighth side 335h extends linearly in the direction orthogonal to the radial direction when viewed from the axial direction. The second side 335b is located on one side in the circumferential direction with respect to the virtual circle VC. The third side 335c is located on the other side in the circumferential direction with respect to the virtual circle VC. That is, the second side 335b and the third side 335c are opposed to each other in the circumferential direction. The second side 335b extends radially outward from one end of the eighth side 335h. The third side 335c extends radially outward from the other end of the eighth side 335h. In the third embodiment, the corner R is provided at the boundary between the eighth side 335h and the second side 335b and between the eighth side 335h and the third side 335c. The fourth side 335d is located on the radial outside with respect to the virtual circle VC. The fourth side 335d extends along the circumferential direction. The fourth side 335d connects radially outer the end on the radial outside of the second side 335b and the end on the radial outside of the third side 335c. In the third embodiment, the fourth side 335d extends in the arc shape along the virtual circle VC. In the third embodiment, the second side 335b and the third side 335c contact with the virtual circle VC. For this reason, the rotor core 330 can be positioned in the circumferential direction by inserting the columnar positioning pin P having the sectional shape of the virtual circle VC into the second hole 337.

In the third embodiment, the first side 335a contacts with the virtual circle VC. When the positioning pin P is inserted into the second hole 337, the positioning pin P contacts with the first side 335a. Consequently, the first side 335a can be used for the rotor core 330 using the positioning pin P. In the third embodiment, the fourth side 335d extends in the arc shape along the virtual circle VC, and contacts with the virtual circle VC. The fourth side 335d constitutes the surface facing the radial inside in the inner peripheral surface of the second hole 337. For this reason, in the fourth side 335d, similarly to the first side 335a, the positioning pin P is caused to come into contact with the first side 335a, which allows the rotor core 330 to be positioned in the radial direction using one positioning pin P. As a result, the jig used for the positioning can be simplified. In the first embodiment, the through-hole 335 includes the first hole 336 and the second hole 337, which are arranged from the radial inside toward the radial outside. As described above, the first hole 336 absorbs the deformation of the rotor core 330 when the shaft 3a is inserted into the central hole 31. The positioning pin P positioning the rotor core 330 is inserted into the second hole 337. That is, the through-hole 335 of the third embodiment separately includes the hole (first hole 336) used to absorb the deformation and the hole (second hole 337) used for the positioning.

In the third embodiment, the through-hole 335 includes the first hole 336 and the second hole 337. The deformation of the fitting protrusion 32 can be promoted to reduce the stress generated during the press-fitting by disposing the first hole 336 close to the central hole 31. On the other hand, the positioning pin P can be disposed on the radial outside by disposing the second hole 337 on the radial outside, and the positioning accuracy of the rotor core 330 can be enhanced. That is, in the third embodiment, the positioning accuracy of the rotor core 330 can be enhanced while the stress generated during the press-fitting is lowered. The first hole 336 absorbs the deformation of the rotor core 330 when the shaft 3a is inserted into the central hole 31, so that the distance between the second side 335b and the virtual circle VC can be set narrow. For this reason, the positioning accuracy can be enhanced when the positioning pins are inserted.

In the third embodiment, the shape of a metal mold punching the second hole 337 can be shared by a plurality of kinds of the rotor cores 330 having different diameters of the central hole 31. As described above, the stress generated in press-fitting the shaft 3a in the central hole 31 can be reduced by disposing the first hole 336 close to the central hole 31. In the plurality of types of the rotor cores 330 having different diameters of the central hole 31, the metal mold of the second hole 337 is shared, and the metal mold corresponding to the diameter of the central hole 31 can be used for the first hole 336. The rotor core in which the first hole 336 is omitted while the through-hole 335 is formed only by the second hole 337 can be used when the diameter of the central hole 31 is larger than that of the third embodiment.

The through-hole 335 of the third embodiment separately includes the first hole 336 and the second hole 337, which have different functions. For this reason, the deformation of the first hole 336 due to the absorption of the deformation can improve the positioning function of the second hole 337. As illustrated in FIG. 11, a pair of virtual lines (second virtual lines) VL2 connecting both the ends in the circumferential direction of the first hole 336 and the center axis J is assumed when viewed from the axial direction. The second hole 337 is located between the pair of virtual lines VL2 in the circumferential direction. That is, the whole second hole 337 overlaps the first hole 336 in the radial direction. For this reason, the first hole 336 can prevent from having an influence of the deformation of the rotor core 330 in press-fitting the shaft 3a in the central hole 31 on the positioning accuracy in the second hole 337.

Rotor cores 430A to 430F of sixth to eleventh modifications of the third embodiment will be described below. Components identical to those of the third embodiment are denoted by the same reference numeral, and the description will be omitted.

Figure 12:
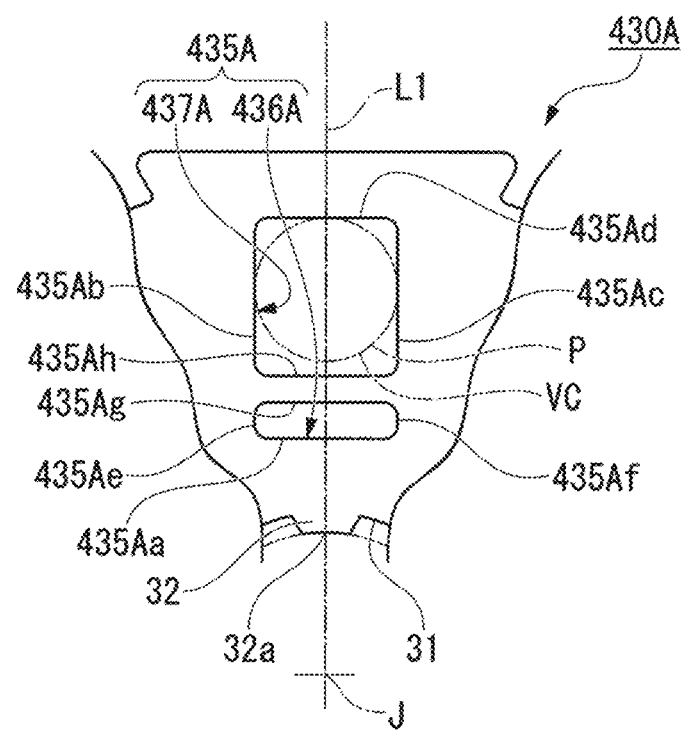
FIG. 12 is an enlarged plan view illustrating a through-hole of a rotor core according to a sixth modification.

FIG. 12 is an enlarged plan view illustrating a through-hole 435A of a part of a rotor core 430A according to a sixth modification. The central hole 31 in which the shaft 3a is press-fitted and a plurality of through-holes 435A arranged in the circumferential direction are made in the rotor core 430A. Similarly to the third embodiment, the plurality of fitting protrusions 32 are provided on the inner circumferential surface of the central hole 31. The through-hole 435A includes a first hole 436A and a second hole 437A located on the radial outside of the first hole 436A. The through-hole 435A overlaps the fitting protrusion 32 in the radial direction. The virtual circle VC included in the second hole 437A as viewed from the axial direction is assumed in the second hole 437A.

The inner peripheral surface of the first hole 436A includes a first side 435Aa, a fifth side 435Ae, a sixth side 435Af, and a seventh side 435Ag. The inner peripheral surface of the second hole 437A includes a second side 435Ab, a third side 435Ac, a fourth side 435Ad, and an eighth side 435Ah. The first hole 436A and the second hole 437A have a substantially rectangular shape. When the rotor core 430A is positioned, the positioning pin P having the sectional shape of the virtual circle VC is inserted into the second hole 437A.

The through-hole 435A of the sixth modification is different from the through-hole 335 of the third embodiment in that the first side 435Aa and the seventh side 435Ag extend linearly in the direction orthogonal to the radial direction. The through-hole 435A of the sixth modification is different from the through-hole 335 of the third embodiment in that the eighth side 435Ah is radially separated from the virtual circle VC and does not contact with the virtual circle VC. The through-hole 435A of the sixth modification is different from the through-hole 335 of the third embodiment in that the fourth side 435Ad extends linearly along the radial direction. In the sixth modification, the fourth side 435Ad contacts with the virtual circle VC at one point.

Figure 13:
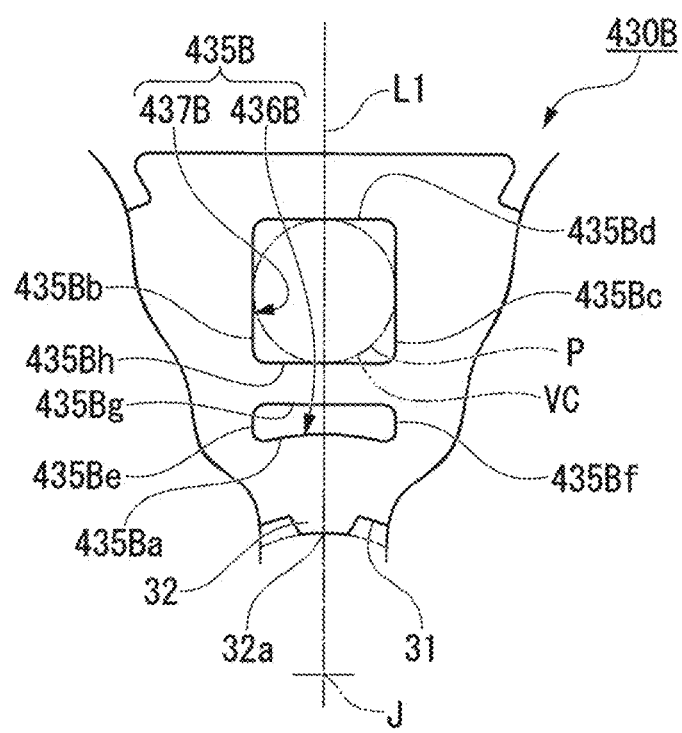
FIG. 13 is an enlarged plan view illustrating a through-hole of a rotor core according to a seventh modification.

FIG. 13 is an enlarged plan view illustrating a through-hole 435B of a part of a rotor core 430B according to a seventh modification. The central hole 31 in which the shaft 3a is press-fitted and a plurality of through-holes 435B arranged along the circumferential direction are made in the rotor core 430B. Similarly to the third embodiment, the plurality of fitting protrusions 32 are provided on the inner circumferential surface of the central hole 31. The through-hole 435B includes a first hole 436B and a second hole 437B located on the radial outside of the first hole 436B. The through-hole 435B overlaps the fitting protrusion 32 in the radial direction. The virtual circle VC included in the second hole 437B as viewed from the axial direction is assumed in the second hole 437B. The inner peripheral surface of the first hole 436B includes a first side 435Ba, a fifth side 435Be, a sixth side 435Bf, and a seventh side 435Bg. The inner peripheral surface of the second hole 437B includes a second side 435Bb, a third side 435Bc, a fourth side 435Bd, and an eighth side 435Bh. The first hole 436B and the second hole 437B have the substantially rectangular shape. When the rotor core 430B is positioned, the positioning pin P having the sectional shape of the virtual circle VC is inserted into the second hole 437B.

The through-hole 435B of the seventh modification is different from the through-hole 335 of the third embodiment in that the seventh side 435Bg extends linearly in the direction orthogonal to the radial direction. The through-hole 435B of the seventh modification is different from the through-hole 335 of the third embodiment in that the fourth side 435Bd extends linearly along the radial direction. In the seventh modification, the fourth side 435Bd contacts with the virtual circle VC.

Figure 14:
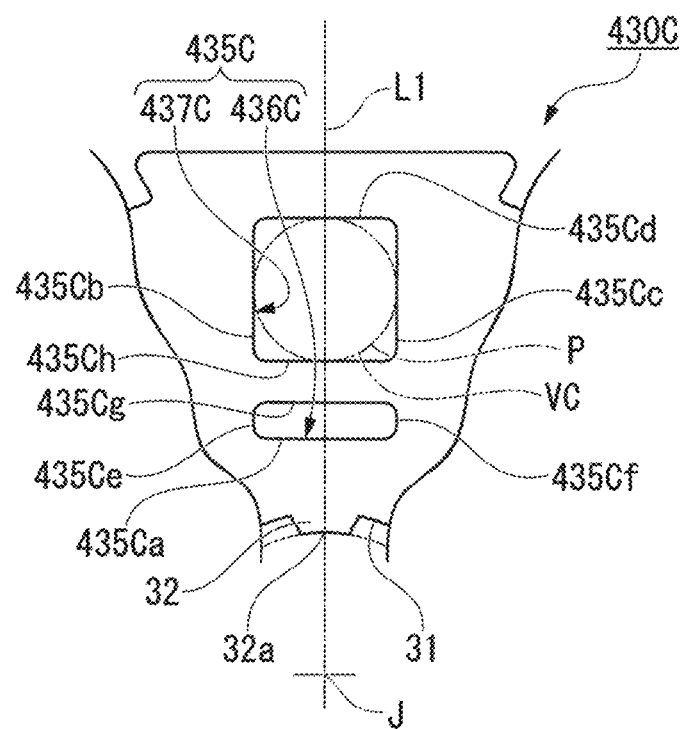
FIG. 14 is an enlarged plan view illustrating a through-hole of a rotor core according to an eighth modification.

FIG. 14 is an enlarged plan view illustrating a through-hole 435C of a part of a rotor core 430C according to an eighth modification. The central hole 31 in which the shaft 3a is press-fitted and a plurality of through-holes 435C arranged along the circumferential direction are made in the rotor core 430C. Similarly to the third embodiment, the plurality of fitting protrusions 32 are provided on the inner circumferential surface of the central hole 31. The through-hole 435C includes a first hole 436C and a second hole 437C located on the radial outside of the first hole 436C. The through-hole 435C overlaps the fitting protrusion 32 in the radial direction. The virtual circle VC included in the second hole 437C as viewed from the axial direction is assumed in the second hole 437C.

The inner peripheral surface of the first hole 436C includes a first side 435Ca, a fifth side 435Ce, a sixth side 435Cf, and a seventh side 435Cg. The inner peripheral surface of the second hole 437C includes a second side 435Cb, a third side 435Cc, a fourth side 435Cd, and an eighth side 435Ch. When the rotor core 430C is positioned, the positioning pin P having the sectional shape of the virtual circle VC is inserted into the second hole 437C. The through-hole 435C of the sixth modification is different from the through-hole 335 of the third embodiment in that the first side 435Ca and the seventh side 435Cg extend linearly in the direction orthogonal to the radial direction.

Figure 15:
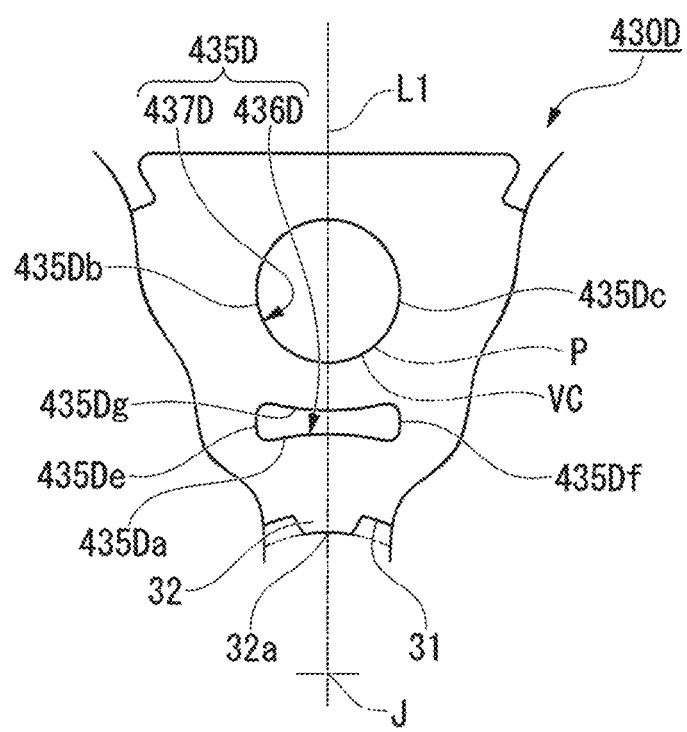
FIG. 15 is an enlarged plan view illustrating a through-hole of a rotor core according to a ninth modification.

FIG. 15 is an enlarged plan view illustrating a through-hole 435D of a part of a rotor core 430D according to a ninth modification. The central hole 31 in which the shaft 3a is press-fitted and a plurality of through-holes 435D arranged along the circumferential direction are made in the rotor core 430D. Similarly to the third embodiment, the plurality of fitting protrusions 32 are provided on the inner circumferential surface of the central hole 31. The through-hole 435D includes a first hole 436D and a second hole 437D located on the radial outside of the first hole 436D. The through-hole 435D overlaps the fitting protrusion 32 in the radial direction. The virtual circle VC included in the second hole 437D as viewed from the axial direction is assumed in the second hole 437D.

The inner peripheral surface of the first hole 436D includes a first side 435Da, a fifth side 435De, a sixth side 435Df, and a seventh side 435Dg. The second hole 437D has the circular shape when viewed from the axial direction. The inner peripheral surface of the second hole 437D is substantially matched with the virtual circle VC. The second hole 437D includes a second side 435Db located on one side in the circumferential direction of the virtual circle VC and a third side 435Dc located on the other side in the circumferential direction of the virtual circle VC. When the rotor core 430D is positioned, the positioning pin P having the sectional shape of the virtual circle VC is inserted into the second hole 437D. The through-hole 435D of the ninth modification is different from the through-hole 335 of the third embodiment in that the second hole 437D has the circular shape substantially matched with the virtual circle VC when viewed from the axial direction. The second hole 437D has the circular shape, so that processing accuracy of the inner peripheral surface of the second hole 437D by punching can be enhanced. As a result, the positioning accuracy of the rotor core 430D using the second hole 437D can be enhanced.

Figure 16:
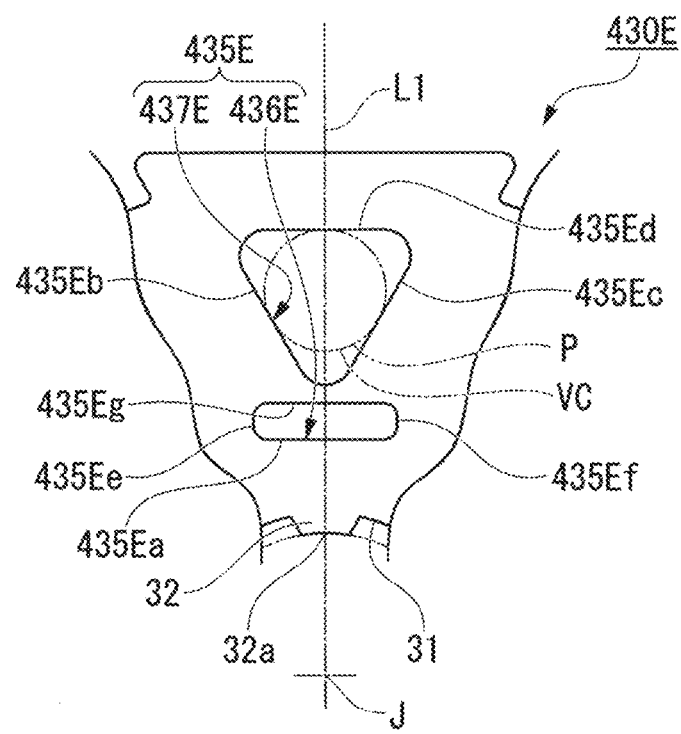
FIG. 16 is an enlarged plan view illustrating a through-hole of a rotor core according to a tenth modification.

FIG. 16 is an enlarged plan view illustrating a through-hole 435E of a part of a rotor core 430E according to a tenth modification. The central hole 31 in which the shaft 3a is press-fitted and a plurality of through-holes 435E arranged along the circumferential direction are made in the rotor core 430E. Similarly to the third embodiment, the plurality of fitting protrusions 32 are provided on the inner circumferential surface of the central hole 31. The through-hole 435E includes a first hole 436E and a second hole 437E located on the radial outside of the first hole 436E. The through-hole 435E overlaps the fitting protrusion 32 in the radial direction. The virtual circle VC included in the second hole 437E as viewed from the axial direction is assumed in the second hole 437E.

The inner peripheral surface of the first hole 436E includes a first side 435Ea, a fifth side 435Ee, a sixth side 435Ef, and a seventh side 435Eg. The inner peripheral surface of the second hole 437E includes a second side 435Eb, a third side 435Ec, and a fourth side 435Ed. The second hole 437E has a triangular shape including the second side 435Eb, the third side 435Ec, and the fourth side 435Ed as three sides when viewed from the axial direction. When the rotor core 430E is positioned, the positioning pin P having the sectional shape of the virtual circle VC is inserted into the second hole 437E. The second hole 437E of the tenth modification is different from the through-holes 335 of the third embodiment mainly in that the second hole 437E does not include the eighth side. The fourth side 435Ed of the tenth modification extends linearly in the direction orthogonal to the radial direction. Both the ends of the fourth side 435Ed are connected to the second side 435Eb and the third side 435Ec with the corner R interposed therebetween. The second side 435Eb and the third side 435Ec extend radially inward from both the ends of the fourth side 435Ed. The second side 435Eb and the third side 435Ec extend linearly while inclining in the center line L1 connecting the center axis J and the center of the virtual circle VC toward the radial inside. The end on the radial inside of the second side 435Eb and the end on the radial inside of the third side 435Ec are connected to each other. The second side 435Eb, the third side 435Ec, and the fourth side 435Ed contact with the virtual circle VC. The virtual circle VC is an inscribed circle of the through-hole 435E having the triangular shape.

Figure 17:
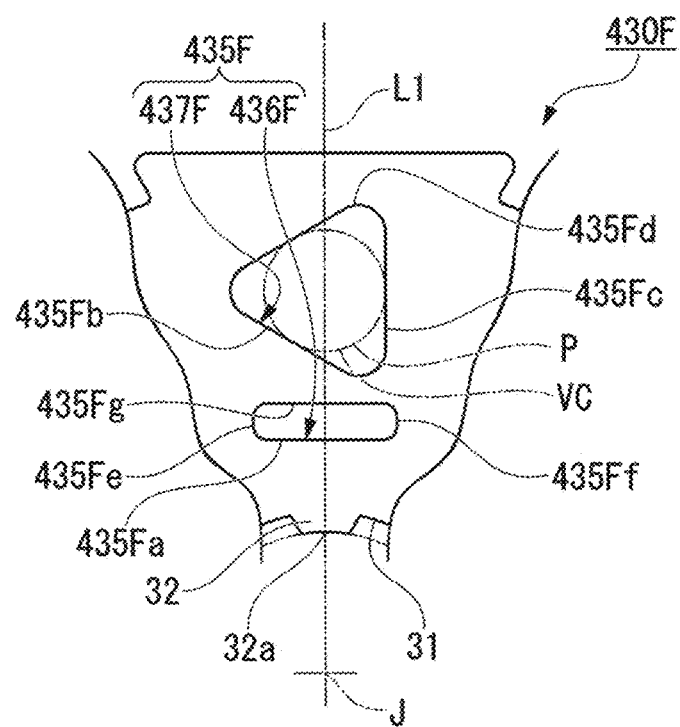
FIG. 17 is an enlarged plan view illustrating a through-hole of a rotor core according to an eleventh modification.

FIG. 17 is an enlarged plan view illustrating a through-hole 435F of a part of a rotor core 430F according to an eleventh modification. The central hole 31 in which the shaft 3a is press-fitted and a plurality of through-holes 435F arranged along the circumferential direction are made in the rotor core 430F. Similarly to the third embodiment, the plurality of fitting protrusions 32 are provided on the inner circumferential surface of the central hole 31. The through-hole 435F includes a first hole 436F and a second hole 437F located radially outside the first hole 436F. The through-hole 435F overlaps the fitting protrusion 32 in the radial direction. The virtual circle VC included in the second hole 437F as viewed from the axial direction is assumed in the second hole 437F.

The inner peripheral surface of the first hole 436F includes a first side 435Fa, a fifth side 435Fe, a sixth side 435Ff, and a seventh side 435Fg. The inner peripheral surface of the second hole 437F includes a second side 435Fb, a third side 435Fc, and a fourth side 435Fd. The second hole 437F has a triangular shape including the second side 435Fb, the third side 435Fc, and the fourth side 435Fd as three sides when viewed from the axial direction. When the rotor core 430F is positioned, the positioning pin P having the sectional shape of the virtual circle VC is inserted into the second hole 437F.

The second hole 437F of the eleventh modification is mainly different from the second hole 437E of the tenth modification in that the second hole 437F is disposed while rotated about the center of the virtual circle VC when viewed from the axial direction.

While embodiments of the present invention and modifications thereof are described above, it will be understood that features, a combination of the features, and so on according to each of the embodiments and the modifications thereof are only illustrative and not restrictive, and that an addition, elimination, and substitution of a feature(s), and other modifications can be made without departing from the scope and spirit of the present invention. The present invention is not limited to the embodiments.

The rotor and the motor including the rotor according to the above embodiments and modifications are mounted on an electric power steering device. The rotor and the motor are not limited to the electric power steering devices, and may be mounted on any device.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor used for an inner rotor type motor, the rotor comprising:
a shaft centered on a center axis extending in a vertical direction;
a rotor core fixed to the shaft; and
a rotor magnet supported by the rotor core,
wherein the rotor core includes a central hole in which the shaft is press-fitted and a plurality of through-holes that pierce in an axial direction and are arranged in a circumferential direction,
a plurality of fitting protrusions that are arranged along the circumferential direction, protrudes radially inward, and contact with the shaft at a front end surface are provided on an inner circumferential surface of the central hole,
the through-hole overlaps the fitting protrusion in a radial direction,
a virtual circle that is included in the through-hole and contacts with an inner peripheral surface of the through-hole at at least two points as viewed from the axial direction is assumed in the through-hole,
the inner peripheral surface of the through-hole includes a first side that is located on a radial inside with respect to the virtual circle and extends along the circumferential direction, a second side that is located on one side in the circumferential direction with respect to the virtual circle and extends along the radial direction, and a third side that is located on another side in the circumferential direction with respect to the virtual circle and extends along the radial direction,
the second side and the third side contact with the virtual circle, and
the first side extends linearly or extends radially outward in a curved manner when viewed from the axial direction.

2. The rotor according to claim 1, wherein the first side extends radially outward in the curved manner when viewed from the axial direction, and
a curvature radius at any point of the first side is greater than or equal to a distance between the point and the center axis when viewed from the axial direction.

3. The rotor according to claim 1, wherein when viewed from the axial direction, a pair of first virtual lines connecting both ends in the circumferential direction of the through-hole and the center axis is assumed, and a front end surface of the fitting protrusion is located between the pair of first virtual lines in the circumferential direction.

4. The rotor according to claim 1, wherein a contact point between the virtual circle and the second side and a contact point between the virtual circle and the third side are symmetrically arranged with respect to a straight line connecting the center axis and the center of the virtual circle when viewed from an axial direction.

5. The rotor according to claim 1, further comprising a fourth side located radially outward with respect to the virtual circle,
wherein the fourth side extends in an arc shape along the virtual circle and contacts with the virtual circle.

6. The rotor according to claim 1, further comprising a fourth side located radially outward with respect to the virtual circle,
wherein the fourth side extends linearly and contacts with the virtual circle.

7. The rotor according to claim 1, wherein the second side extends radially outward from one end of the first side, and the third side extends radially outward from another end of the first side.

8. The rotor according to claim 7, wherein the first side contacts with the virtual circle.

9. The rotor according to claim 1, wherein the through-hole includes a first hole including the first side and a second hole including the virtual circle.

10. The rotor according to claim 9, wherein when viewed from the axial direction, a pair of second virtual lines connecting both ends in the circumferential direction of the first hole and the center axis is assumed, and the second hole is located between the pair of second virtual lines in the circumferential direction.

11. The rotor according to claim 1, further comprising a plurality of the rotor magnets,
    wherein a number of the rotor magnets, a number of the through-holes, and a number of the fitting protrusions are matched with each other.

12. The rotor according to claim 1, wherein the rotor magnet has an annular shape in which magnetic poles are arranged along the circumferential direction.

13. The rotor according to claim 1, wherein the rotor magnet is fixed to an outer peripheral surface of the rotor core.

14. The rotor according to claim 1, wherein an inside of the through-hole is a cavity.

15. A motor comprising:
    the rotor according to claim 1; and
    a stator located on a radial outside of the rotor.

\* \* \* \* \*